United States Patent
Kurio

[11] 3,711,229
[45] Jan. 16, 1973

[54] CORNER SEAL SPRING FOR A ROTARY PISTON ENGINE

[75] Inventor: Noriyuki Kurio, Hiroshima, Japan

[73] Assignee: Toyo Kogyo Co., Ltd., Aki-gun, Hiroshima-ken, Japan

[22] Filed: May 25, 1971

[21] Appl. No.: 146,759

[30] Foreign Application Priority Data

May 25, 1970 Japan..........................45/51649

[52] U.S. Cl. ...................418/121, 418/122, 418/142
[51] Int. Cl..........F01c 19/02, F03c 3/00, F04c 27/00
[58] Field of Search ......418/121, 122, 142; 277/81 P

[56] References Cited

UNITED STATES PATENTS

| | | | |
|---|---|---|---|
| 3,180,562 | 4/1965 | Bentele | 418/42 |
| 3,127,095 | 3/1964 | Froede | 418/121 |
| 3,301,231 | 1/1967 | Tado | 418/122 |

*Primary Examiner*—William L. Freeh
*Assistant Examiner*—John J. Vrablik
*Attorney*—Sughrue, Rothwell, Zinn & Macpeak

[57] ABSTRACT

A corner seal spring urging a corner seal within a groove in each apex portion of a rotary piston of a rotary piston engine for sealing between the rotary piston and the adjacent end wall. The spring is made of a wire spring, formed into a U-shape with its both ends bent outwardly when viewed from the front and twisted into a γ-shape when viewed from the side.

2 Claims, 5 Drawing Figures

PATENTED JAN 16 1973  3,711,229

INVENTOR
NORIYUKI KURIO

BY Sughrue, Rothwell, Mion, Zinn & Macpeak

ATTORNEYS

3,711,229

CORNER SEAL SPRING FOR A ROTARY PISTON ENGINE

BACKGROUND OF THE INVENTION

This invention relates to improvements in a corner seal spring for urging a corner seal mounted on a rotary piston in a rotary piston engine.

There exists an apex seal mounted to each apex of the rotary piston, a side seal provided along the periphery of the piston at the end face of the piston and a corner seal disposed between both ends at the end faces of the piston as a gas seal device in a rotary piston engine, and the respective seals are urged in the required direction by their respective springs.

Heretofore, since the corner seal spring for urging the corner seal provided in a circular groove at the end face of the piston is a U-shaped leaf spring, the corner seal slightly moves or rotates in the groove by its pushing up of the side seal with the result that the corner seal spring provided on the back of the corner seal also moves together with the corner seal. As a result, both ends of the corner seal spring repeatedly collide with both side ends of the apex seal so as to gradually wear the apex seal, with the undesirable result that it an apex seal of carbon material is used, for example, the apex seal is damaged.

SUMMARY OF THE INVENTION

The present invention contemplates the elimination of the aforementioned disadvantages of the conventional corner seal spring and provides a novel and improved corner seal spring which is made of a wire spring formed into a U-shaped with its both ends bent outwardly when viewed from the front and twisted into a γ-shape when viewed from the side. Therefore, since the diameter of the corner seal spring is larger than the thickness of the leaf spring and both upper ends of the corner seal spring are bent outwardly, the side surface of the apex seal is not worn. Further, since the corner seal spring is made of wire spring, the outer diameter of the corner seal spring is made slightly larger than the corner seal groove so that it is mounted in compression with the result that it may be resiliently contacted with the inner peripheral wall of the corner seal groove. As a result, the rotation of the spring due to the rotation or movement of the corner seal may be prevented so that the wear of the apex seal is prevented in cooperation with the aforesaid effect.

BRIEF DESCRIPTION OF THE DRAWING

Further objects, features and advantages of the present invention will become apparent from the following description taken in conjunction with the accompanying drawings, in which.

DESCRIPTION OF THE PREFERRED EMBODIMENT

Figure 1:
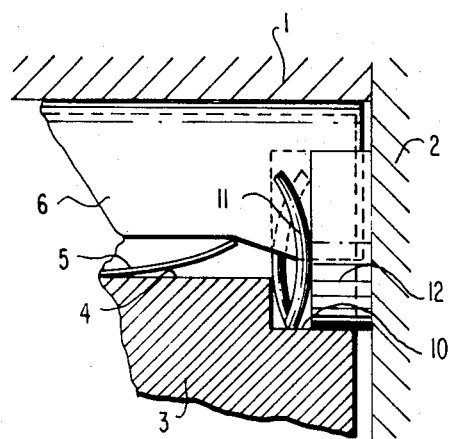
FIG. 1 is a side elevational view in section of the portion of a rotary piston engine assembled with a corner seal spring according to the present invention.
Figure 2:
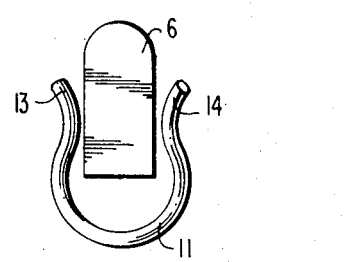
FIG. 2 is an end view of a portion of the engine shown in FIG. 1.

Reference is now made to the drawings. An apex seal groove 4 is provided on the top of a rotary piston 3 rotating in planetary motion in a casing consisting of a peripheral wall 1 and end wall 2. An apex seal 6 is radially slidably engaged through an apex seal spring 5 with the apex seal groove 4 so that it is urged onto the peripheral wall 1.

Further, a side seal groove 7 is provided along the periphery of the piston 3 at the end face of the piston 3 wherein a side seal 9 is engaged through a side seal spring 8 with the depressed portion of the end wall 2. A circular corner seal groove 10 is provided on the corner portion of the end face of the piston 3 so that the corner seal 12 is engaged by the corner seal spring in the groove 10 so as to be urged against the end wall 2.

Figure 4:
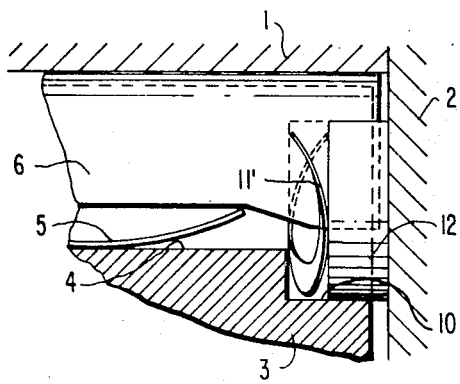
FIG. 4 is a side elevational view in section of a portion of a rotary piston engine assembled with the conventional corner seal spring.
Figure 5:
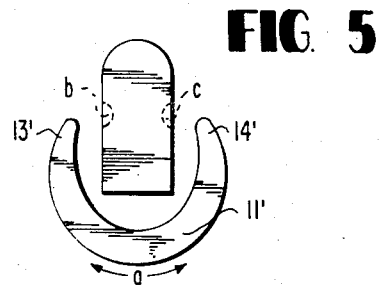
FIG. 5 is an end view of a portion of the engine shown in FIG. 4.
Figure 3:
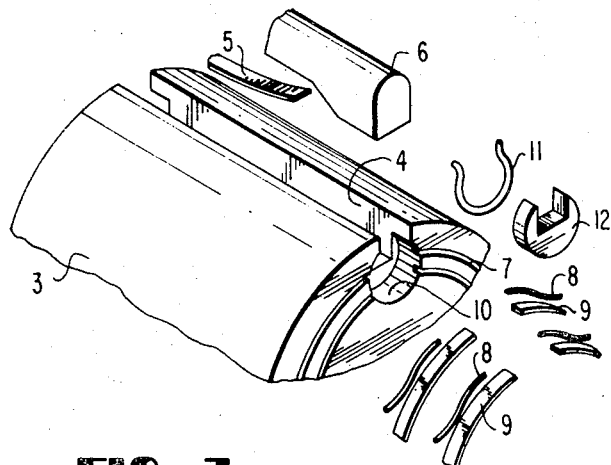
FIG. 3 is an exploded perspective view of the main portion of the rotary piston engine.

The conventional structure is thus described, but as shown in FIGS. 4 and 5 in the conventional gas seal device, the corner seal spring 11' is formed of a leaf spring so that the shape is a U-shape when viewed from the front and is a γ-shape when viewed from the side. For this reason, if the corner seal 12 is slightly moved or rotated by the pushing up of the side seal 9, the corner seal spring 11' is repeatedly rotated in the direction as designated by the arrows a in FIG. 5. As a result, both ends 13' and 14' of the corner seal spring 11' repeatedly collide with both side faces of the apex seal 6 so that the recesses b and c are worn into the apex seal in the manner shown in FIG. 5 with the result that the apex seal 6 is damaged.

This invention has improved the corner seal spring 11' shown in FIGS. 4 and 5. The corner seal spring 11 of this invention adopts a wire spring of circular section formed into a U-shape with its both ends 13 and 14 bent outwardly when viewed from the front and twisted into a γ-shape when viewed from the side.

With the corner seal spring 11 of this invention, if the corner seal 12 is rotated, the corner seal spring 11 is rotated so that even if both upper ends thereof repeatedly collide with the apex seal 6, since the diameter of the wire of the corner seal spring 11 is larger than the thickness of the conventional leaf spring 11' and both upper ends 13 and 14 are bent outwardly, the side face of the apex seal 6 is not worn and the apex seal 6 is not damaged. If the outer diameter of the corner seal spring 11 is made slightly larger than the inner diameter of the groove 10 of the corner seal, the corner seal spring 11 resiliently contacts with the inner peripheral wall of the corner seal groove 10 with the result that the rotation of the corner seal spring 11 itself is restrained so that its durability is increased together with the aforesaid effect. Further, since the corner seal spring is made of wire, the surface area thereof is smaller than that of the conventional leaf spring so that it is not affected by the high temperature of the explosion and combustion and the low temperature upon intake of mixture gas in temperature change, with the result that the durability of the spring to permanent deformation is improved substantially and it can be easily manufactured.

What is claimed is:

1. In a rotary piston engine having a housing with a peripheral wall and a pair of parallel end walls, a rotary piston with an apex portion having a groove disposed within the housing for rotation relative thereto, an apex seal and an apex seal spring for urging said apex seal into engagement with the peripheral wall disposed within said apex portion groove, a side seal groove provided on each end face along the periphery of the piston, a side seal and a side seal spring for urging the side seal into engagement with the end wall disposed within said side seal groove, a corner seal groove provided on the end face of the piston at each corner portion, and a corner seal and a corner seal spring for urging the corner seal into engagement with the end wall disposed within said corner seal groove; the improvement wherein said corner seal spring is formed of a wire spring and has a U-shape with its both ends bent outwardly when viewed from the front and twisted into a γ-shape when viewed from the side said apex seal having an end portion located between the ends of said corner seal spring.

2. A rotary piston engine as claimed in claim 1 wherein the outer diameter of said corner seal spring is slightly larger than the inner diameter of the corner seal groove so as to contact resiliently with an inner peripheral wall of said corner seal groove.

* * * * *